(12) United States Patent
Park et al.

(10) Patent No.: US 12,463,275 B2
(45) Date of Patent: Nov. 4, 2025

(54) ELECTRODE ASSEMBLY INCLUDING PLASTIC MEMBER APPLIED TO ELECTRODE TABS-LEAD COUPLING PORTION AND SECONDARY BATTERY INCLUDING THE SAME

(71) Applicant: LG Chem, Ltd., Seoul (KR)

(72) Inventors: Chan Woo Park, Daejeon (KR); Kwan Hong Bae, Daejeon (KR); Byung Soo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 81 days.

(21) Appl. No.: 16/620,997

(22) PCT Filed: Dec. 24, 2018

(86) PCT No.: PCT/KR2018/016607
§ 371 (c)(1),
(2) Date: Dec. 10, 2019

(87) PCT Pub. No.: WO2019/139282
PCT Pub. Date: Jul. 18, 2019

(65) Prior Publication Data
US 2020/0203700 A1    Jun. 25, 2020

(30) Foreign Application Priority Data

Jan. 9, 2018  (KR) .................. 10-2018-0002887

(51) Int. Cl.
*H01M 10/04*  (2006.01)
*B23K 20/10*  (2006.01)
(Continued)

(52) U.S. Cl.
CPC ....... *H01M 50/178* (2021.01); *H01M 50/105* (2021.01); *H01M 50/536* (2021.01); *H01M 50/54* (2021.01)

(58) Field of Classification Search
CPC ............ H01M 50/531; H01M 50/533; H01M 50/538; H01M 50/105; H01M 50/172;
(Continued)

(56) References Cited

U.S. PATENT DOCUMENTS

2001/0007729 A1    7/2001  Kitoh et al.
2003/0228515 A1   12/2003  Woehrle et al.
(Continued)

FOREIGN PATENT DOCUMENTS

CN    1469498 A    1/2004
CN    1755964 A    4/2006
(Continued)

OTHER PUBLICATIONS

Hiromitsu, "JP2013182677A Laminate Type Power Storage Device", Espacenet Machine Translation (Year: 2013).*
(Continued)

*Primary Examiner* — Allison Bourke
*Assistant Examiner* — Charlene Bermudez
(74) *Attorney, Agent, or Firm* — Lerner David LLP

(57) ABSTRACT

An electrode assembly has a structure in which a plurality of electrodes, from each of which an electrode tab protrudes, is stacked, wherein the electrodes are coupled to each other by welding the electrode tabs to each other, the electrode tabs are coupled to an electrode lead, the electrode lead wraps the electrode tabs by including an electrode lead main body with a first surface coupled to the upper surface of the electrode tabs, a second surface bent at a first bent portion in a state of being connected to the first surface so as to be coupled to a lower surface of the electrode tabs, and a third surface bent at a second bent portion in a state of being connected to the second surface and configured to be withdrawn outside a battery case, and the electrode tabs are coupled to the electrode lead by clinching.

14 Claims, 6 Drawing Sheets

(51) Int. Cl.
*H01M 10/0585* (2010.01)
*H01M 50/105* (2021.01)
*H01M 50/178* (2021.01)
*H01M 50/536* (2021.01)
*H01M 50/54* (2021.01)

(58) Field of Classification Search
CPC .......... H01M 50/178; H01M 10/0585; H01M 10/04; H01M 10/28; H01M 50/00; H01M 50/536; H01M 50/54; H01M 4/75; H01M 50/176; H01M 50/534; H01M 50/553; H01M 50/569; H01M 50/528; H01M 10/045; H01M 10/0468; H01M 10/0472; H01M 10/0481; H01M 10/052; H01M 10/0583; H01M 50/514; H01M 50/564; H01M 50/474; H01M 50/46; H01M 10/0463; H01M 50/136
See application file for complete search history.

(56) References Cited

U.S. PATENT DOCUMENTS

| | | |
|---|---|---|
| 2005/0210660 A1 | 9/2005 | Li |
| 2006/0073382 A1 | 4/2006 | Urano et al. |
| 2007/0196732 A1 | 8/2007 | Tatebayashi et al. |
| 2007/0202399 A1 | 8/2007 | Shin et al. |
| 2009/0104525 A1 | 4/2009 | Nakagawa et al. |
| 2009/0142659 A1* | 6/2009 | Lai ................ H01M 50/54 429/163 |
| 2011/0081574 A1* | 4/2011 | Jo ................ H01M 10/0585 429/211 |
| 2011/0129718 A1* | 6/2011 | Lee ................ H01M 10/02 429/153 |
| 2011/0135998 A1 | 6/2011 | Ahn |
| 2011/0253436 A1* | 10/2011 | Hasegawa ........ H01M 50/571 204/279 |
| 2011/0287284 A1 | 11/2011 | Heo |
| 2012/0121965 A1* | 5/2012 | Makino ........... H01M 50/528 429/156 |
| 2012/0196173 A1 | 8/2012 | Kim |
| 2013/0230766 A1* | 9/2013 | Ahn ................ H01M 50/178 429/179 |
| 2013/0280587 A1 | 10/2013 | Kim |
| 2014/0220409 A1* | 8/2014 | Hohenthanner .... H01M 50/545 429/130 |
| 2014/0356697 A1 | 12/2014 | Shin et al. |
| 2016/0141709 A1* | 5/2016 | Kim ................ H01M 10/049 429/179 |
| 2016/0197335 A1 | 7/2016 | Kim |
| 2016/0329546 A1* | 11/2016 | Ham ............... H01M 10/0486 |
| 2017/0149024 A1* | 5/2017 | Park ................ H01M 50/178 |
| 2017/0346049 A1 | 11/2017 | Sasaki |
| 2019/0088925 A1* | 3/2019 | Harutyunyan ........ H01M 4/362 |
| 2019/0181415 A1* | 6/2019 | Oh ................ H01M 50/553 |

FOREIGN PATENT DOCUMENTS

| | | | |
|---|---|---|---|
| CN | 101026250 A | | 8/2007 |
| CN | 101305483 A | | 11/2008 |
| CN | 201191634 Y | | 2/2009 |
| CN | 102088105 A | | 6/2011 |
| CN | 102468471 A | | 5/2012 |
| CN | 103314468 A | | 9/2013 |
| CN | 104577025 A | | 4/2015 |
| CN | 105684183 A | | 6/2016 |
| CN | 106207244 A | | 12/2016 |
| JP | S55176084 U | | 12/1980 |
| JP | 2000003726 A | | 1/2000 |
| JP | 2000215877 A | | 8/2000 |
| JP | 2004014516 A | | 1/2004 |
| JP | 2009099488 A | | 5/2009 |
| JP | 2013182677 A | * | 9/2013 |
| JP | 2014212012 A | | 11/2014 |
| JP | 2015005456 A | | 1/2015 |
| JP | 2017069046 A | | 4/2017 |
| JP | 2017216148 A | | 12/2017 |
| KR | 20060033642 A | | 4/2006 |
| KR | 20080007697 A | | 1/2008 |
| KR | 20080090753 A | * | 10/2008 |
| KR | 20110061281 A | | 6/2011 |
| KR | 20110128483 A | | 11/2011 |
| KR | 101136288 B1 | | 4/2012 |
| KR | 20120076020 A | | 7/2012 |
| KR | 20140018135 A | | 2/2014 |
| KR | 20140049654 A | | 4/2014 |
| KR | 20160085061 A | | 7/2016 |
| KR | 20160119509 A | | 10/2016 |
| KR | 20170095072 A | | 8/2017 |
| KR | 20190027528 A | * | 9/2017 .......... H01M 50/533 |
| KR | 102313058 B1 | * | 10/2018 |

OTHER PUBLICATIONS

Um et al; "Pouch Type Lithium Secondary Battery Using an Insulating Resin in the Interconnection Between AN"; Machine Translation of KR 1020080090753 A obtained from WIPO Patentscope (Year: 2008).*

Hiromitsu; Laminate Type Power Storage Device; Machine Translation of JP 2013182677 A obtained from WIPO Patentscope (Year: 2013).*

Hwang et al; "KR102313058B1 Secondary Battery Cell with Less Modification of External Form of Battery Case"; Machine translation of KR102313058B1 obtained from Espacenet Patent Translate (Year: 2018).*

Sung et al; "KR20190027528A Pouch type secondary battery"; Machine translation of KR20190027528A obtained from Espacenet (Year: 2017).*

International Search Report for Application No. PCT/KR2018/016607, mailed Apr. 12, 2019, pp. 1-2.

Extended European Search Report for Application No. 18899172.3 dated Oct. 14, 2020, 8 pages.

* cited by examiner

ELECTRODE ASSEMBLY INCLUDING PLASTIC MEMBER APPLIED TO ELECTRODE TABS-LEAD COUPLING PORTION AND SECONDARY BATTERY INCLUDING THE SAME

CROSS-REFERENCE TO RELATED APPLICATIONS

This application is a national phase entry under 35 U.S.C. § 371 of International Application No. PCT/KR2018/016607, filed Dec. 24, 2018, published in Korean, which claims the benefit of Korean Patent Application No. 10-2018-0002887 filed on Jan. 9, 2018 with the Korean Intellectual Property Office, the disclosures of which are herein incorporated by reference in their entirety.

TECHNICAL FIELD

The present invention relates to an electrode assembly including a plastic member applied to an electrode tabs-lead coupling portion, and more particularly to an electrode assembly configured to have a structure in which a plurality of electrode tabs is coupled to each other by welding, an electrode lead is coupled to the electrode tabs while wrapping the electrode tabs, the electrode lead includes an electrode lead main body, constituted by a first surface configured to be coupled to the upper surface of the electrode tabs, a second surface bent at a first bent portion in the state of being connected to the first surface so as to be coupled to the lower surface of the electrode tabs, and a third surface bent at a second bent portion in the state of being connected to the second surface so as to be withdrawn outside a battery case, and the electrode tabs are coupled to the electrode lead by clinching.

BACKGROUND ART

Secondary batteries, which are capable of being charged and discharged, have attracted considerable attention as power sources for devices requiring high output and large capacity, including an electric vehicle (EV), a hybrid electric vehicle (HEV), and a plug-in hybrid electric vehicle (Plug-In HEV), which have been developed to solve problems, such as air pollution, caused by existing gasoline and diesel vehicles using fossil fuels.

Secondary batteries may be classified based on the structure of an electrode assembly including a positive electrode, a negative electrode, and a separator interposed between the positive electrode and the negative electrode. Typically, the electrode assembly may be a jelly-roll type (wound type) electrode assembly, which is configured to have a structure in which a long sheet type positive electrode and a long sheet type negative electrode are wound in the state in which a separator is interposed between the positive electrode and the negative electrode, a stacked type electrode assembly, which is configured to have a structure in which a plurality of positive electrodes, cut so as to have a predetermined size, and a plurality of negative electrodes, cut so as to have a predetermined size, are sequentially stacked in the state in which separators are interposed respectively between the positive electrodes and the negative electrodes, or a stacked/folded type electrode assembly, which is configured to have a structure in which unit cells, such as bi-cells or full cells, each of which is configured to have a structure in which predetermined numbers of positive electrodes and negative electrodes are stacked in the state in which separators are disposed respectively between the positive electrodes and the negative electrodes, are wound.

FIG. 1 is an exploded perspective view schematically showing the general structure of a conventional typical pouch-shaped secondary battery.

Referring to FIG. 1, the pouch-shaped secondary battery, denoted by reference numeral 10, includes an electrode assembly 30, electrode tabs 40 and 50 extending from the electrode assembly 30, electrode leads 60 and 70 connected respectively to the electrode tabs 40 and 50 by welding, and a battery case 20 configured to receive the electrode assembly 30.

The electrode assembly 30 is a power-generating element including positive electrodes and negative electrodes sequentially stacked in the state in which separators are disposed respectively between the positive electrodes and the negative electrodes. The electrode assembly is configured to have a stacked type structure or a stacked/folded type structure. The electrode tabs 40 and 50 extend from respective electrode plates of the electrode assembly 30. The electrode leads 60 and 70 are electrically connected to the electrode tabs 40 and 50, extending from the respective electrode plates of the electrode assembly 30, respectively, by welding. In addition, insulating films 80, configured to improve sealability between the battery case 20 and the electrode leads 60 and 70 and, at the same time, to achieve electrical insulation between the battery case 20 and the electrode leads 60 and 70, are attached to portions of the upper and lower surfaces of the electrode leads 60 and 70.

Each of the electrode tabs 40 and 50 is made of aluminum, copper, or an aluminum alloy. The electrode tabs 40 and 50, which protrude so as to extend from electrode current collectors of the electrode assembly 30, are connected to the electrode leads 60 and 70, for example, in the form of welded portions at which the electrode tabs 40 and 50 are integrally coupled to the electrode leads 60 and 70, respectively, by welding.

In the case in which the electrode tabs and the electrode leads are made of different materials, ultrasonic welding may be used in order to couple the electrode tabs to the electrode leads. In the case in which the magnitude of ultrasonic energy is high, some of the electrode tabs may be cut due to over-welding. In the case in which low ultrasonic energy is used in order to prevent over-welding, the electrode tabs may become separated from the electrode leads at the welded portion therebetween due to under-welding at the time of coupling the electrode tabs to the electrode leads.

In addition, the surface of the ultrasonic-welded portion may extend or protrude, i.e. burrs may be formed, whereby the inner surface of the battery case may be damaged. In order to prevent this, a tape is attached to the surface of the battery case that is opposite the ultrasonic-welded portion.

In connection therewith, Japanese Patent Application Publication No. 2000-215877 discloses a battery having a structure in which a lead terminal having an S-shaped bent portion is coupled to one surface of a terminal portion of each of a positive electrode and a negative electrode. Since the lead terminal is coupled to one surface of electrode tabs by welding, however, it is not possible to solve the above problem.

Korean Patent Application Publication No. 2008-0090753 and Korean Patent Application Publication No. 2016-0119509 each disclose a pouch-shaped lithium secondary battery having a structure in which an insulative resin is applied to a connection portion between an electrode lead and electrode tabs in order to wrap the connection portion. Since the electrode tabs are coupled to the electrode lead only at one surface of the electrode tabs and one surface of the electrode lead that face each other, however, some of the electrode tabs, the thickness of each of which is relatively small, may be damaged during the coupling process, or the electrode tabs may be separated from the electrode lead due to the weak force of coupling therebetween.

Therefore, there is urgent necessity for an electrode assembly configured to have a structure that is capable of stably securing coupling between electrode tabs and an electrode lead and preventing the surface of a connection portion between the electrode tabs and the electrode lead from becoming rough, thereby preventing damage to a battery case.

DISCLOSURE

Technical Problem

The present invention has been made in view of the above problems, and it is an object of the present invention to provide an electrode assembly configured to have a structure in which a plurality of electrode tabs is coupled to an electrode lead, configured to have a structure that wraps the electrode tabs, by clinching and in which the electrode lead comprises an electrode lead main body, constituted by a first surface configured to be coupled to the upper surface of the electrode tabs, a second surface bent at a first bent portion in the state of being connected to the first surface so as to be coupled to the lower surface of the electrode tabs, and a third surface bent at a second bent portion in the state of being connected to the second surface so as to be withdrawn outside a battery case.

Technical Solution

In accordance with an aspect of the present invention, the above and other objects can be accomplished by the provision of an electrode assembly configured to have a structure in which
a plurality of electrodes, from each of which an electrode tab protrudes, is stacked, wherein the electrodes are coupled to each other by welding the electrode tabs to each other,
the electrode tabs are coupled to an electrode lead,
the electrode lead wraps the electrode tabs by including an electrode lead main body with a first surface coupled to an upper surface of the electrode tabs, a second surface bent at a first bent portion in a state of being connected to the first surface so as to be coupled to a lower surface of the electrode tabs, and a third surface bent at a second bent portion in a state of being connected to the second surface and configured to be withdrawn outside a battery case, and
the electrode tabs are coupled to the electrode lead by clinching.

In general, electrode tabs protrude from one side or opposite sides of an electrode assembly having a structure in which flat-type electrodes are stacked. Electrode tabs of electrodes having the same polarity are coupled to each other, and coupling is performed by welding, such as ultrasonic welding.

While the ultrasonic welding is performed in order to couple the electrode tabs to each other, as described above, the outer surface of the electrode tabs may extend or protrude, i.e. burrs may be formed. In the case in which the welded portion of the electrode tabs comes into contact with the battery case, therefore, the battery case may be damaged.

In the present invention, the electrode lead is configured to have a structure that wraps the electrode tabs, and the electrode lead is coupled to the upper surface and the lower surface of the electrode tabs, whereby it is possible to prevent the rough surface of the welded portion of the electrode tabs from coming into contact with the battery case.

In addition, conventionally, there is a problem in which the electrode tabs, which are relatively thin, are cut during the coupling process using welding. However, the electrode assembly according to the present invention includes an electrode lead having a structure that surrounds opposite surfaces of the electrode tabs, and the electrode tabs are protected by the electrode lead, whereby it is possible to solve the problem in which the electrode tabs are cut.

In addition, the electrode tabs are coupled to the electrode lead by clinching. Compared with coupling using welding, welding strength increases, and a problem in which the electrode tabs are damaged due to over-welding or in which adhesion strength decreases due to under-welding is prevented, whereby welding reliability is improved.

In the electrode assembly, in which the electrode tabs are coupled to the electrode lead, which wraps the upper surface and the lower surface of the electrode tabs, as described above, the electrodes may be either or both of positive electrodes and negative electrodes. It is preferable for both the positive electrodes and the negative electrodes to have the above structure in consideration of improvement in the safety of a battery.

A secondary battery may be configured to have a structure in which the electrode assembly described above is received in a battery case, wherein the battery case may be a pouch-shaped battery case including a structure in which a concave portion configured to receive the electrode assembly is disposed in at least one of an upper case or a lower case.

The battery case is manufactured so as to have an electrode assembly reception portion having a shape corresponding to the size and thickness of the electrode assembly, which is received in the electrode assembly reception portion. An electrode assembly for high-capacity batteries may have an increased thickness. In this case, the depth of the electrode assembly reception portion formed in the battery case may also be increased. However, there is a limitation on the extent to which the depth of the electrode assembly reception portion can be increased due to the durability and formability of a laminate sheet for the battery case. Consequently, the battery case is manufactured in consideration of the capacity or thickness of the electrode assembly that is received in the battery case and the thickness of the laminate sheet.

In the electrode assembly according to the present invention, the electrode tabs may be coupled to the electrode lead, and the third surface of the electrode lead main body may be withdrawn outside the battery case through a sealed portion of the battery case. Consequently, the position of the electrode tabs coupling portion may be changed depending on the position at which the concave portion, configured to receive the electrode assembly, is formed.

That is, the concave portion configured to receive the electrode assembly may be disposed in the upper case or in the lower case, or the concave portion configured to receive the electrode assembly may be disposed in each of the upper case and the lower case. A coupling portion of the electrode tabs may be disposed at the middle portion of the electrode assembly in a stacking direction of the electrode assembly, or may be disposed at one side of the electrode assembly in the stacking direction of the electrode assembly.

For example, in the case in which the concave portion is disposed in the upper case, the electrode tabs are coupled to each other at the lower side of the electrode assembly, and the electrode tabs are coupled to the electrode lead. In the case in which the concave portion is disposed in the lower case, the electrode tabs are coupled to each other at the upper side of the electrode assembly, and the electrode tabs are coupled to the electrode lead.

Also, in the case in which the concave portion is formed in each of the upper case and the lower case, the electrode tabs coupling portion is disposed at the middle portion of the electrode assembly in the stacking direction of the electrode assembly.

In a concrete example, a plastic member may surround outer edges of the first surface and the second surface of the electrode lead main body. Since the plastic member is added, it is possible to wrap burrs formed on the surface of the electrode tabs or burrs formed at the outer edge of the electrode lean main body at the time of ultrasonic welding for coupling between the electrode tabs, whereby it is possible to prevent damage to the battery case.

A thickness of the plastic member may be equal to a thickness of the electrode lead main body, or may be smaller than the thickness of the electrode lead main body. In the case in which the thickness of the plastic member is larger than the thickness of the electrode lead main body, the coupling between the electrode tabs and the electrode lead through clinching may be adversely affected, which is undesirable.

The first bent portion is located between the first surface and the second surface of the electrode lead main body, and the electrode lead is bent 180 degrees at the first bent portion such that the first surface and the second surface face each other in the state in which the electrode tabs are located therebetween. Consequently, a notch may be formed in the first bent portion such that the electrode lead is easily bent to wrap the electrode tabs. Specifically, in the case in which the notch is formed inside in the direction in which bending is performed, it is possible to prevent an increase in the thickness of the first bent portion while the first surface and the second surface face each other as the result of bending, thereby capable of easy bending.

The second bent portion is bent such that the second surface and the third surface are connected perpendicularly to each other. As will be described below, the bent state of the second bent portion is maintained such that the second surface and the third surface are located so as to be perpendicular to each other even when the electrode tabs are bent, and thus the third surface of the electrode lead main body is deformed so as to be withdrawn outside the battery case.

In a concrete example, an insulating film may be further added to the third surface. The insulating film is attached to the portion of the electrode lead that extends through the sealed portion of the battery case in order to prevent the sealing force of the battery case from being lowered.

Meanwhile, in order to minimize the formation of dead space in the battery case by reducing the overall size of the electrode assembly coupled to the electrode lead, the electrode assembly may be received in the concave portion configured to receive the electrode assembly, and then the electrode tabs coupled to the electrode lead may be bent so as to be parallel to the stacking direction of the electrode assembly.

In accordance with another aspect of the present invention, there is provided a secondary battery configured to have a structure in which at least a portion of the electrode assembly is received in a pouch-shaped battery case and in which the third surface of the electrode lead main body is withdrawn outside the battery case through the sealed portion of the battery case.

In accordance with another aspect of the present invention, there is provided a method of manufacturing an electrode assembly, the method including:

(a) preparing an electrode assembly configured to have a structure in which a positive electrode and a negative electrode are stacked in the state in which a separator is interposed between the positive electrode and the negative electrode,
(b) preliminarily coupling electrode tabs of the electrode assembly to each other,
(c) positioning an electrode lead to surround opposite surfaces of the electrode tabs, and
(d) coupling the electrode tabs to the electrode lead by clinching.

That is, in the method of manufacturing the electrode assembly according to the present invention, first, electrode tabs of electrodes having the same polarity are preliminarily coupled to each other, and then an electrode lead configured to wrap the outer surface of the coupled electrode tabs is coupled to the electrode tabs by clinching. Consequently, it is possible not only to increase the force of coupling between the electrode tabs and the electrode lead but also to prevent damage to the electrode tabs at the time of coupling using a welding method or to prevent the battery case from being damaged by the welded surface.

At step (b), the electrode tabs may be coupled to each other by welding, specifically ultrasonic welding. The method may further include bending the electrode tabs so as to be parallel to the stacking direction of the electrode assembly after step (d).

In accordance with a further aspect of the present invention, there are provided a battery pack including the battery cell and a device including the battery pack. The battery pack and the device are well known in the art to which the present invention pertains, and thus a detailed description thereof will be omitted.

For example, the device may be a laptop computer, a netbook computer, a tablet PC, a mobile phone, an MP3 player, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart, or an energy storage system. However, the present invention is not limited thereto.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is said to be 'connected' to another part in the following description of the present invention, not only may the one part be directly connected to the another part, but also, the one part may be indirectly connected to the another part via a further part. In addition, that a certain element is 'included' does not mean that other elements are excluded, but means that such elements may be further included unless mentioned otherwise.

Reference will now be made in detail to the preferred embodiments of the present invention, examples of which are illustrated in the accompanying drawings.

Figure 1:
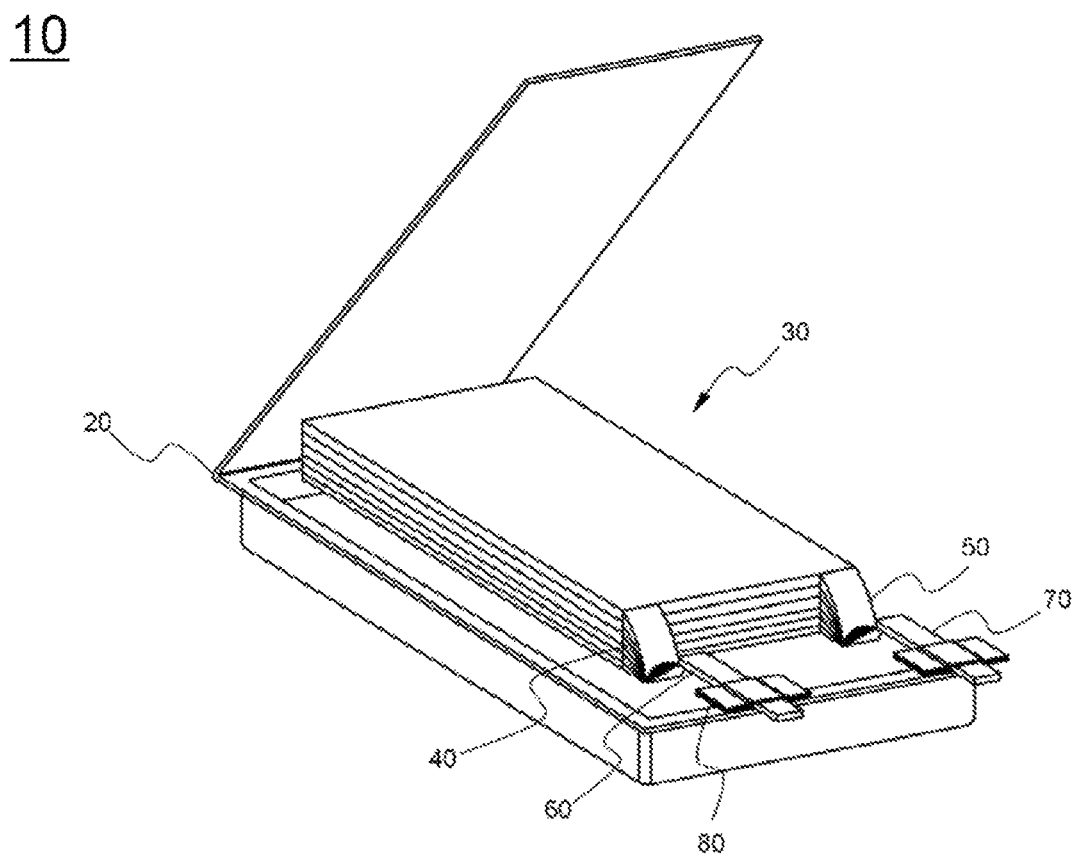
FIG. 1 is a perspective view showing the general structure of a typical pouch-shaped lithium secondary battery including a stacked type electrode assembly.
Figure 2:
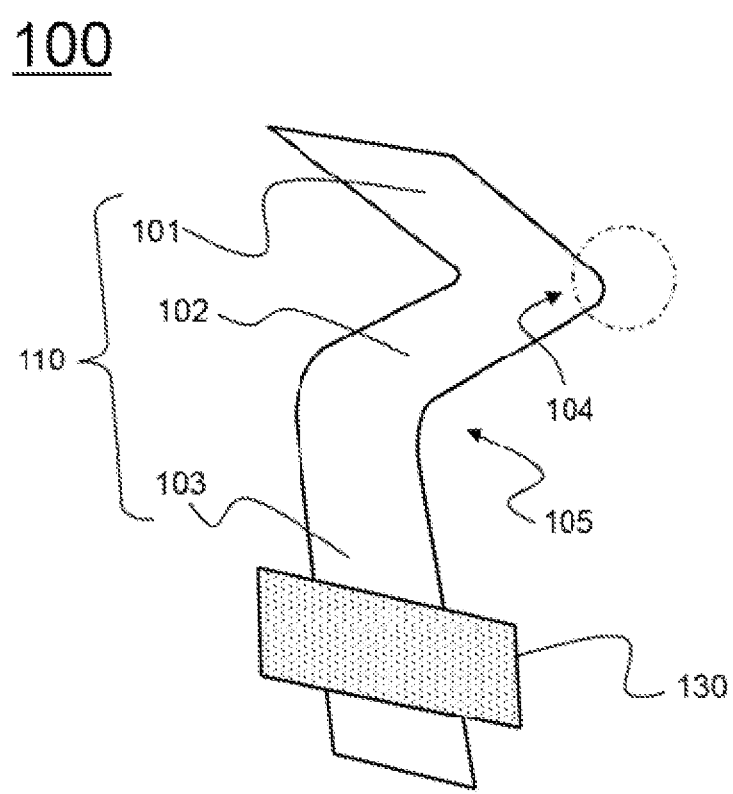
FIG. 2 is a perspective view showing an electrode lead according to an embodiment of the present invention.
Figure 3:
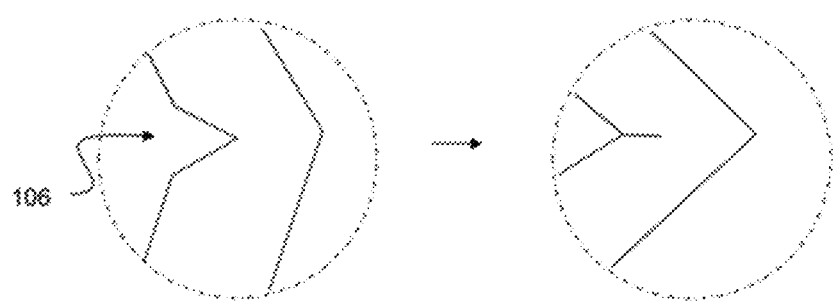
FIG. 3 is a partial enlarged view of FIG. 2.

FIG. 2 is a perspective view showing an electrode lead according to an embodiment of the present invention, and FIG. 3 is a partial enlarged view of FIG. 2.

Referring to FIGS. 2 and 3, the electrode lead, denoted by reference numeral 100, includes an electrode lead main body 110, which includes a first surface 101, a first bent portion 104, a second surface 102, a second bent portion 105, and a third surface 103. The first surface 101 is located at one end of the electrode lead main body 110 based on the first bent portion 104, the second surface 102 is located at the middle portion of the electrode lead main body 110, and the first bent portion 104 is located between the first surface 101 and the second surface 102. The third surface 103 is located at the other end of the electrode lead main body 110, the second bent portion 105 is located between the third surface 103 and the second surface 102, and the second bent portion 105 is bent such that the second surface 102 and the third surface 103 are connected perpendicularly to each other.

An insulating film 130 is shown as being added to the third surface 103; however, an electrode lead 100 having no insulating film 130 is also included in the present invention.

FIG. 3, which is an enlarged view of FIG. 2, shows the state of the electrode lead before the electrode lead is completely bent (a left-side electrode lead enlarged view) and the state of the electrode lead after the electrode lead is completely bent (a right-side electrode lead enlarged view). A notch 106 is formed in the first bent portion 104 in the inward direction in which bending is performed. A bending process may be easily performed such that the first surface 101 and the second surface 102 are located at the upper surface and the lower surface of an electrode tab.

Figure 4:
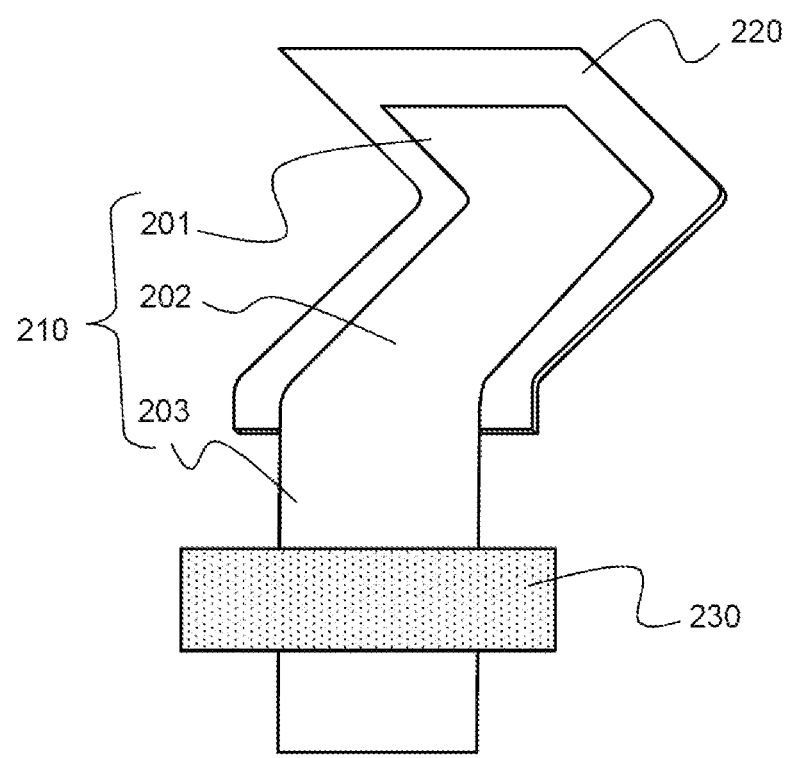
FIG. 4 is a perspective view showing an electrode lead according to another embodiment of the present invention.

FIG. 4 is a perspective view showing an electrode lead according to another embodiment of the present invention.

Referring to FIG. 4, the electrode lead, denoted by reference numeral 200, includes an electrode lead main body 210 and a plastic member 220 disposed so as to surround the outer edge of a portion of the electrode lead main body 210.

The electrode lead 200 has a structure corresponding to the structure of the electrode lead 100 of FIG. 2. The electrode lead main body 210 includes a first surface 201, a second surface 202, and a third surface 203. An insulating film 230 is attached to the third surface 203, and the plastic member 220 is added so as to surround the outer edge of a portion of the third surface 203, the outer edge of the first surface 201, and the outer edge of the second surface 202.

The plastic member 220 is configured to have a structure that wraps burrs that may be formed at the outer edges of the first surface 201 to the third surface 203, and is capable of preventing a battery case from being damaged by the electrode lead.

Figure 5:
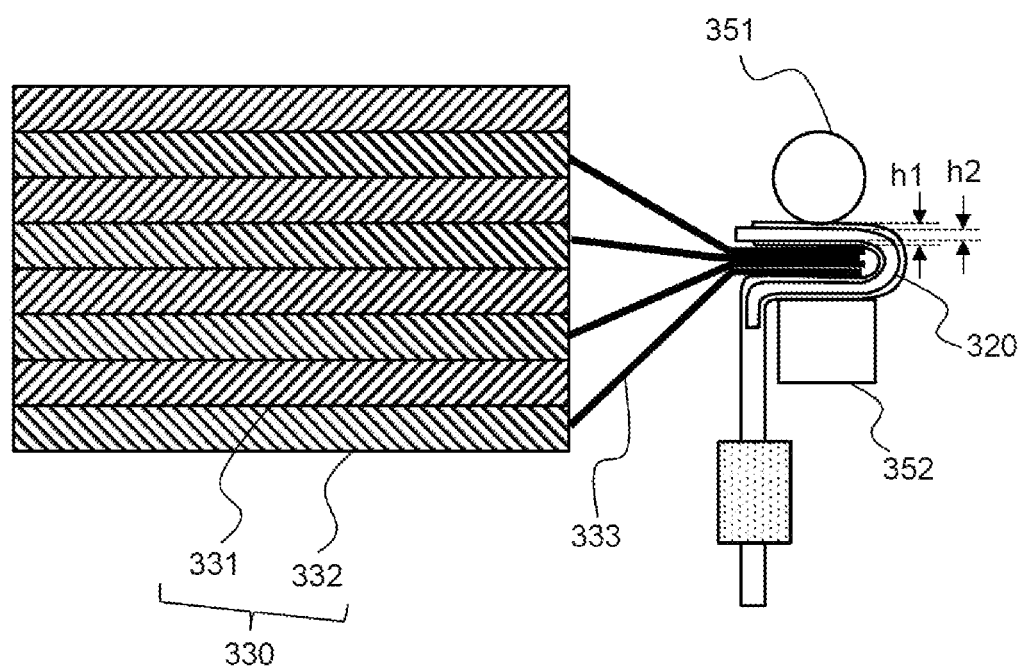
FIG. 5 is a side view showing the state in which the electrode lead of FIG. 4 is coupled to an electrode assembly.
Figure 6:
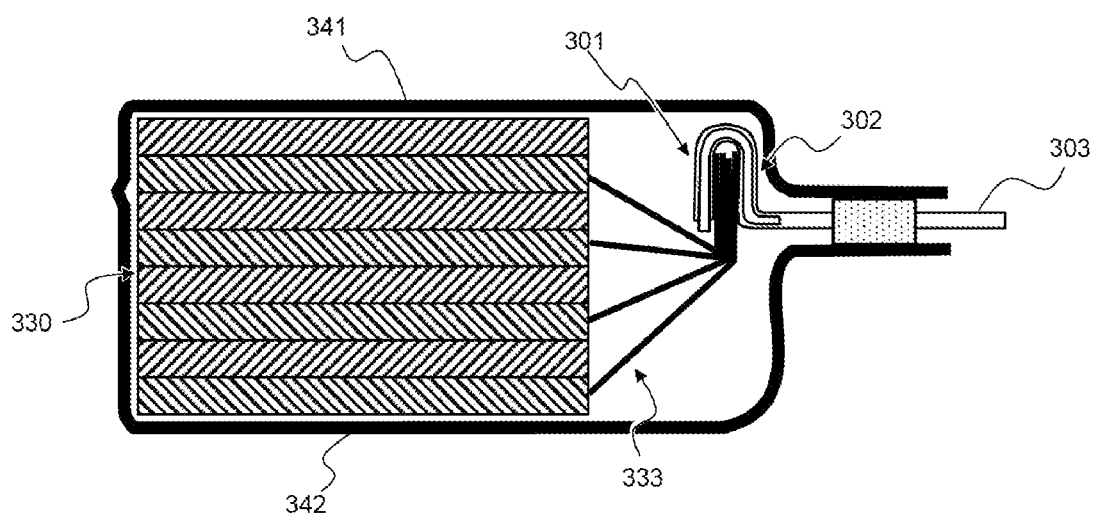
FIG. 6 is a side sectional view showing the state in which the electrode assembly of FIG. 5 is received in a battery case.

FIG. 5 is a side view schematically showing the state in which the electrode lead of FIG. 4 is coupled to an electrode assembly, and FIG. 6 is a side sectional view schematically showing the state in which the electrode assembly of FIG. 5 is received in a battery case.

Referring to FIGS. 5 and 6, the electrode assembly, denoted by reference numeral 330, is a stacked type electrode assembly, in which positive electrodes 331 and negative electrodes 332 are stacked in the state in which separators (not shown) are interposed respectively therebetween. Negative electrode tabs 333 protruding from one-side ends of the negative electrodes 332 are coupled to each other at the protruding ends thereof in order to form a bundle of electrode tabs. As shown in FIG. 6, the electrode lead is bent 180 degrees such that a first surface 301 and a second surface 302 face each other in the state in which the bundle of electrode tabs 333 is located therebetween. The first surface 301 of the electrode lead main body is located at the upper surface of the bundle of electrode tabs 333, and the second surface 302 of the electrode lead main body is located at the lower surface of the bundle of electrode tabs 333.

The thickness h1 of the electrode lead main body is shown as being greater than the thickness h2 of the plastic member. Alternatively, however, the thickness of the electrode lead main body may be equal to the thickness of the plastic member.

In the state in which a clinching punch 351 is located so as to face the first surface 301 of the electrode lead main body and in which a die 352 is located so as to face the electrode tabs and the second surface 302 of the electrode lead main body, the clinching punch 351 is pushed downwards to complete coupling between the electrode tabs and the electrode lead.

The electrode assembly 330 is configured such that the electrode tabs coupling portion is disposed at the middle portion of the electrode assembly 330 in the stacking direction of the electrode assembly 330. The electrode assembly 330 is received in the battery case of FIG. 6, i.e. a battery case having a structure in which concave portions configured to receive the electrode assembly are disposed both in an upper case 341 and a lower case 342.

Of course, the electrode tabs 333 may be formed at the upper part or the lower part of the electrode assembly 330 in the stacking direction of the electrode assembly 330 in consideration of the thickness of the electrode assembly 330 and the positions of the concave portions disposed in the battery case.

The electrode tabs 333 are received in the battery case in the state in which the portion of the electrode tabs 333 that is coupled to the electrode lead is bent so as to be parallel to the stacking direction of the electrode assembly 330. In the case in which the electrode tabs 333 are received in the battery case in the state in which the electrode tabs 333 are not bent, the size of the dead space in the battery case increases, which is undesirable.

Those skilled in the art to which the present invention pertains will appreciate that various applications and modifications are possible based on the above description without departing from the scope of the present invention.

DESCRIPTION OF REFERENCE NUMERALS

10: Pouch-shaped secondary battery
20: Battery case
30: Electrode assembly
40, 50: Electrode tabs
60, 70: Electrode leads
80: Insulating films
100, 200: Electrode leads
101, 201, 301: First surfaces
102, 202, 302: Second surfaces
103, 203, 303: Third surfaces
104: First bent portion
105: Second bent portion
106: Notch
110, 210: Electrode lead main bodies
130, 230: Insulating films
220, 320: Plastic members
330: Electrode assembly
331: Positive electrodes
332: Negative electrodes
333: Negative electrode tabs
341: Upper case
342: Lower case
351: Clinching punch
352: Die
h1: Thickness of electrode lead main body
h2: Thickness of plastic member

INDUSTRIAL APPLICABILITY

As is apparent from the above description, an electrode assembly according to the present invention is configured to have a structure in which a plurality of electrode tabs is stacked, and in which an electrode lead, configured to have a structure that wraps the outer surface of the electrode tabs, is coupled to the electrode tabs by clinching. Since the electrode lead is configured to have a structure that wraps both the upper surface and the lower surface of the electrode tabs, it is possible to prevent the electrode tabs from being damaged during the coupling process.

In addition, since the electrode lead is configured to have a structure that covers the outer surface of the electrode tabs, as described above, it is possible to prevent the inner surface of a battery case from being damaged by burrs formed at the outer surface of the electrode tabs during the process of coupling the electrode tabs.

The invention claimed is:

1. An electrode assembly comprising:
a plurality of electrodes being stacked, from each of which an electrode tab protrudes, wherein:
the electrodes are coupled to each other by welding the electrode tabs to each other,
the electrode tabs are coupled to an electrode lead,
the electrode lead including an electrode lead main body with a front surface and a rear surface, the rear surface made up of a first surface coupled to an upper surface of the electrode tabs, a second surface bent at a first bent portion and connected to the first surface so as to be coupled to a lower surface of the electrode tabs such that the electrode lead wraps the electrode tabs, the first surface connected to the second surface by the first bent portion, and a third surface bent at a second bent portion and connected to the second surface and configured to be withdrawn outside a battery case, the second surface connected to the third surface by the second bent portion, and
the electrode tabs are coupled to the electrode lead by clinching and are not welded to the electrode lead,
wherein a plastic member coats and extends along portions of outer edge surfaces of a portion of the electrode lead main body, the outer edge surfaces connecting the front and rear surfaces of the electrode lead main body, and wherein the plastic member is not disposed on the front surface of the electrode lead main body and the plastic member is not disposed on the rear surface of the electrode lead main body, to prevent damage to the battery case from burrs that may be formed on a surface of the welded electrode tabs or at the outer edge surfaces of the electrode lead main body,
the plastic member having a first surface extending away from the outer edge surfaces of the electrode lead parallel to the first surface of the electrode lead, and a second surface extending away from the outer edge surfaces of the electrode lead parallel to the second surface of the electrode lead.

2. The electrode assembly according to claim 1, wherein each of the electrodes is a positive electrode or a negative electrode.

3. A secondary battery comprising:
the electrode assembly according to claim 1 received in a battery case, wherein the battery case is a pouch-shaped battery case including a structure in which a concave portion configured to receive the electrode assembly is disposed in at least one of an upper case or a lower case.

4. The electrode assembly according to claim 1, wherein a coupling portion of the electrode tabs is disposed at a middle portion of the electrode assembly in a stacking direction of the electrode assembly.

5. The electrode assembly according to claim 1, wherein a thickness of the plastic member is equal to a thickness of the electrode lead main body.

6. The electrode assembly according to claim 1, wherein a notch is formed in the first bent portion, the notch extending inward from an outer surface of the electrode lead toward the electrode tabs coupled between the first and second surfaces of the electrode lead.

7. The electrode assembly according to claim 1, wherein the second bent portion is bent such that the second surface and the third surface are connected perpendicularly to each other.

8. The electrode assembly according to claim 1, wherein an insulating film is further added to the third surface.

9. The electrode assembly according to claim 1, wherein the electrode tabs coupled to the electrode lead are bent so that portions of the electrode tabs that are clinched to the electrode lead each extend parallel to a stacking direction of the plurality of electrodes.

10. A secondary battery comprising:
the electrode assembly according to claim 1 received in a pouch-shaped battery case, wherein at least a portion of the third surface of the electrode lead main body is withdrawn outside the battery case through a sealed portion of the battery case.

11. The electrode assembly according to claim 1, wherein a coupling portion of the electrode tabs is disposed at one side of the electrode assembly in a stacking direction of the electrode assembly.

12. An electrode assembly comprising:
a plurality of electrodes being stacked, from each of which an electrode tab protrudes, wherein:
the electrodes are coupled to each other by welding the electrode tabs to each other,
the electrode tabs are coupled to an electrode lead,
the electrode lead including an electrode lead main body with a front surface and a rear surface, the rear surface made up of a first surface coupled to an upper surface of the electrode tabs, a second surface bent at a first bent portion and connected to the first surface so as to be coupled to a lower surface of the electrode tabs such that the electrode lead wraps the electrode tabs, the first surface connected to the second surface by the first bent portion, and a third surface bent at a second bent portion and connected to the second surface and configured to be withdrawn outside a battery case, the second surface connected to the third surface by the second bent portion, and
the electrode tabs are coupled to the electrode lead by clinching and are not welded to the electrode lead,
wherein outer edge surfaces of a portion of the electrode lead main body are disposed between two regions of a plastic member that coat and extend along portions of the outer edge surfaces, the outer edge surfaces connecting the front and rear surfaces of the electrode lead main body, to prevent damage to the battery case from burrs that may be formed on a surface of the welded electrode tabs or at the outer edge surfaces of the electrode lead main body,
wherein the plastic member is not disposed on the front surface of the electrode lead main body and the plastic member is not disposed on the rear surface of the electrode lead main body,
the plastic member having a first surface extending away from the outer edge surfaces of the electrode lead parallel to the first surface of the electrode lead, and a second surface extending away from the outer edge surfaces of the electrode lead parallel to the second surface of the electrode lead, and
wherein the electrode tabs coupled to the electrode lead are bent so that portions of the electrode tabs that are clinched to the electrode lead each extend parallel to a stacking direction of the plurality of electrodes.

13. An electrode assembly comprising:
a plurality of electrodes being stacked, from each of which an electrode tab protrudes, wherein:
the electrodes are coupled to each other by welding the electrode tabs to each other,
the electrode tabs are coupled to an electrode lead,
the electrode lead including an electrode lead main body with a first surface coupled to an upper surface of the electrode tabs, a second surface bent at a first bent portion in a state of being connected to the first surface so as to be coupled to a lower surface of the electrode tabs such that the electrode lead wraps the electrode tabs, and a third surface bent at a second bent portion in a state of being connected to the second surface and configured to be withdrawn outside a battery case, and
the electrode tabs are coupled to the electrode lead by clinching and are not welded to the electrode lead,
wherein a plastic member covers and extends along portions of outer edge surfaces connecting the first surface and the second surface of the electrode lead main body, and a thickness of the plastic member is smaller than a thickness of the electrode lead main body in a direction perpendicular to the first surface and the second surface of the electrode lead main body.

14. The electrode assembly according to claim 1, wherein a thickness of the plastic member is equal to or smaller than a thickness of the electrode lead main body in a direction perpendicular to the first surface and the second surface of the electrode lead main body.

* * * * *